(12) United States Patent
Fangmann et al.

(10) Patent No.: US 9,299,512 B2
(45) Date of Patent: Mar. 29, 2016

(54) DEVICE FOR SWITCHING AND CONTROLLING ELECTRICAL APPARATUSES

(71) Applicant: Johnson Electric S.A., Murten (CH)

(72) Inventors: Gerhard Fangmann, Marienheide (DE); Udo Balgheim, Hueckeswagen (DE); Martin Koepsell, Ennepetal (DE)

(73) Assignee: JOHNSON ELECTRIC S.A., Murten (CH)

( * ) Notice: Subject to any disclaimer, the term of this patent is extended or adjusted under 35 U.S.C. 154(b) by 0 days.

(21) Appl. No.: 14/330,448

(22) Filed: Jul. 14, 2014

(65) Prior Publication Data
US 2015/0021154 A1  Jan. 22, 2015

(30) Foreign Application Priority Data
Jul. 16, 2013 (DE) .......................... 10 2013 011 815

(51) Int. Cl.
| | |
|---|---|
| *H01H 13/14* | (2006.01) |
| *H01H 13/52* | (2006.01) |
| *F16C 29/04* | (2006.01) |
| *H01H 3/50* | (2006.01) |
| *H01H 13/85* | (2006.01) |

(52) U.S. Cl.
CPC ............... *H01H 13/52* (2013.01); *F16C 29/04* (2013.01); *H01H 3/50* (2013.01); *H01H 13/14* (2013.01); *H01H 13/85* (2013.01); *H01H 2013/525* (2013.01); *H01H 2207/03* (2013.01); *H01H 2215/00* (2013.01); *H01H 2221/026* (2013.01); *H01H 2221/044* (2013.01)

(58) Field of Classification Search
CPC ....... G04C 3/001; H01H 13/14; H01H 13/50; H01H 3/50; H01H 13/85; H01H 13/52; H01H 2207/03; H01H 2221/044; H01H 2221/026; H01H 2215/00; H01H 2013/525; Y10T 74/20636
USPC ......................................................... 200/521
See application file for complete search history.

(56) References Cited

U.S. PATENT DOCUMENTS

| | | | |
|---|---|---|---|
| 2,347,874 A | 5/1944 | Bluemle | |
| 4,451,719 A | 5/1984 | Lauterburg et al. | |
| 8,822,864 B2 * | 9/2014 | Borg | ........................ H01H 9/20 200/538 |

FOREIGN PATENT DOCUMENTS

DE          29 09 824 A1     9/1979

* cited by examiner

*Primary Examiner* — Renee Luebke
*Assistant Examiner* — Anthony R. Jimenez
(74) *Attorney, Agent, or Firm* — Muncy, Geissler, Olds & Lowe, P.C.

(57) ABSTRACT

A device for switching and controlling electrical apparatus, has a guide bearing for creating haptics indicating the position of the device. The guide bearing has one bearing part constructed as a switch housing and one bearing part constructed as an actuating element. The guide bearing has a control path formed on one of the bearing parts and a rolling-body mount constructed on the other bearing part. A rolling body is held in the rolling-body mount. A haptic spring presses the rolling body onto the control path. The structure of this device is suitable for creating haptics, without the operational reliability and service life of the guide bearing being appreciably impaired.

16 Claims, 3 Drawing Sheets

DEVICE FOR SWITCHING AND CONTROLLING ELECTRICAL APPARATUSES

CROSS REFERENCE TO RELATED APPLICATIONS

This non-provisional patent application claims priority under 35 U.S.C. §119(a) from Patent Application No. 102013011815.8 filed in Germany on Jul. 16, 2013, the entire contents of which is hereby incorporated by reference.

FIELD OF THE INVENTION

The invention relates to a device for switching and controlling electrical apparatuses, with a guide bearing, which has at least one bearing part constructed as a switch housing and also at least one bearing part constructed as an actuating element.

BACKGROUND OF THE INVENTION

Electrical apparatuses can be shifted to various operating states by means of the switching and controlling arrangements. Suitable devices for this are preferably constructed as step switches or accelerator switches that can be hand- or finger-operated, in which the actuating element is generally incorporated into a grip structure to be grasped by the human hand. In order to be able to reliably switch or control as many operating states as possible with a single actuating element, it is known to arrange resistances in the travel of the actuating element, which make it possible to sense reaching, leaving or a change of operating states by means of haptics stimulating the human sense of touch. Devices of this type generally have technically complex designs however, by means of which the operational reliability and the service life of the guide bearing are disadvantageously lowered.

Hence there is a desire for a device of the generic type mentioned above, the structure of which is suitable for creating haptics, without the operational reliability and the service life of the guide bearing being appreciably impaired.

SUMMARY OF THE INVENTION

Accordingly, in one aspect thereof, the present invention provides a device for switching and controlling electrical apparatuses, with a guide bearing, which has at least one bearing part constructed as a switch housing and also at least one bearing part constructed as an actuating element, wherein the guide bearing has at least one control path formed on at least one of the bearing parts thereof and also at least one rolling-body mount constructed on the respectively other bearing part, in that at least one rolling body is held in the rolling-body mount of the one bearing part, and in that the rolling-body mount has at least one haptic spring pressing the rolling body onto the control path of the respectively other bearing part.

The resistances acting between the bearing parts in the travel of the actuating element during an actuation of the actuating element are therefore based on an advantageously low-wear rolling and/or sliding of the rolling body on at least one of the two bearing parts. The rolling body deflected by the control path against the haptic spring represents a resistance that can be overcome with particularly low wear for the actuating element, the resistance profile of which resistance represented on the control path is dependent both on the spring characteristic of the haptic spring and on the course of the control path. With the resistance profile, haptics are finally created when actuating the actuating element, for which the rolling-body-aided engagement of the bearing parts leads to a significant increase of the operational reliability and also the service life of the guide bearing.

Preferably, the rolling body is a ball. Owing to the two-dimensionally curved surface thereof, balls have a high surface strength, by means of which the operational reliability and the service life of the guide bearing are further increased. Materials suitable for the balls are corrosion-resistant metals, glass or ceramic in particular, which even make the device according to the invention suitable for use in surgical apparatuses. Fundamentally, it is however also conceivable that the rolling body has a different rotationally symmetric geometry, for example that of a sphere or a barrel. The rolling-body mount preferably has a spring chamber, with at least one opening for the rolling body facing the control path, accommodating the haptic spring in one of the bearing parts. However, it lies within the scope of the invention to construct the rolling-body mount in the manner of a rolling-body cage, as a separate component that can be fixed between the bearing parts.

In order to be able to build the device according to the invention with a simple design and dimension the same to be as small as possible, it is preferred that the control path is constructed on the actuating element and the rolling-body mount is constructed on the switch housing. A kinematic reversal of this assignment may be very sensible with respect to custom solutions, so the same is likewise a constituent of the invention.

In a preferred embodiment of the invention, the guide bearing is constructed to form a linear bearing, as is generally used in step switches, accelerator switches or trigger switches that can be actuated by hand or finger. To this end, each control path preferably runs in a normal plane orientated in the guide direction of the actuating element. However, the invention is not limited to the construction of the guide bearing as a linear bearing, but rather also comprises the construction of the guide bearing to form a pivot bearing, in a correspondingly changed course of the control path, as is generally used in so-called rotary switches.

To construct a resistance profile improving the haptic sensing of various operating states, it is suggested according to a particularly advantageous embodiment of the invention that the control path has at least one latching recess arranged in the course thereof. Latching recesses of this type have a distinctive resistance profile, which is particularly suitable for haptically capturing various operating states. In the case of a rolling body constructed as a ball, the latching recess preferably has a recess geometry accommodating the ball in a form-fitting manner. To construct a softer resistance profile, the latching recess can however also have an oversize with respect to the rolling-body geometry. The latching recess can also have rounded recess edges with respect to the surroundings thereof, for influencing the resistance profile.

A further option for constructing distinctive resistance profiles is to provide the control path with at least one switching step constructed in the course thereof. Switching steps of this type are in particular suitable for dividing the course into a plurality of path sections, wherein the same are then assigned to various operating states of the electrical apparatus.

Preferably, the control path has at least one track groove constructed in the course thereof, the groove profile of which is adapted to the rolling-body geometry for creating as large a running surface as possible. With a track groove enlarging the running surface, notch tensions occurring in the rolling region of the rolling body are reduced, so that the track groove consequently contributes to an increase of the operational reliability and service life of the guide bearing.

A resistance profile represented on the control path may be produced by a track groove that has a course deviating from the guide direction of the actuating element. In this case, it is the deviation which deflects the rolling body against the haptic spring and thus constitutes a resistance that can be overcome in a particularly low-wearing manner. With a deviation extending over the entire length of a track groove in this manner, the control path has a resistance profile which is particularly suitable for haptically sensing a control of a certain operating state of an electrical apparatus.

Preferably, the track groove has at least one track groove end delimited by the latching recess, in order to be able to also haptically sense the limits of predetermined control regions.

Alternatively or in addition, the track groove has at least one track groove end delimited by a shaped stop. The shaped stop has a stop surface interacting with the rolling body in a form-fitting manner, which is likewise suitable for constructing particularly distinctive resistance profiles. To construct a particularly soft resistance profile, the track groove can however also have at least one open track groove end running out of a surface of the actuating element in an elongated manner.

Preferably, at least one return spring acting on the actuating element is assigned to the guide bearing. The resistance profile constructed on the course of the control path is therefore used definitively for overlaying the reset forces transferred to the actuating element from the return spring with resistance forces from the haptic spring. It is however also fundamentally possible to dispense with the installation of a return spring, as a resistance profile extending over the entire length of the control path is fundamentally suitable for being designed in such a manner that resistance forces trigger an automatic reset of the actuating element to a rest position.

Preferably, the guide bearing has a plurality of control paths, against which at least one rolling body held in the rolling-body mount bears resiliently. In order to protect mutually engaged bearing surfaces of the guide bearing from a component-loading force load by means of the haptic springs, the control paths are preferably constructed evenly, preferably opposite one another at the periphery of one of the bearing parts of the guide bearing. A further advantage of a guide bearing having a plurality of control paths is the possibility of providing the control paths with courses that are constructed differently from one another. Thus, advantageously complex resistance profiles can be composed on the actuating element from comparatively simply constructed control paths.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
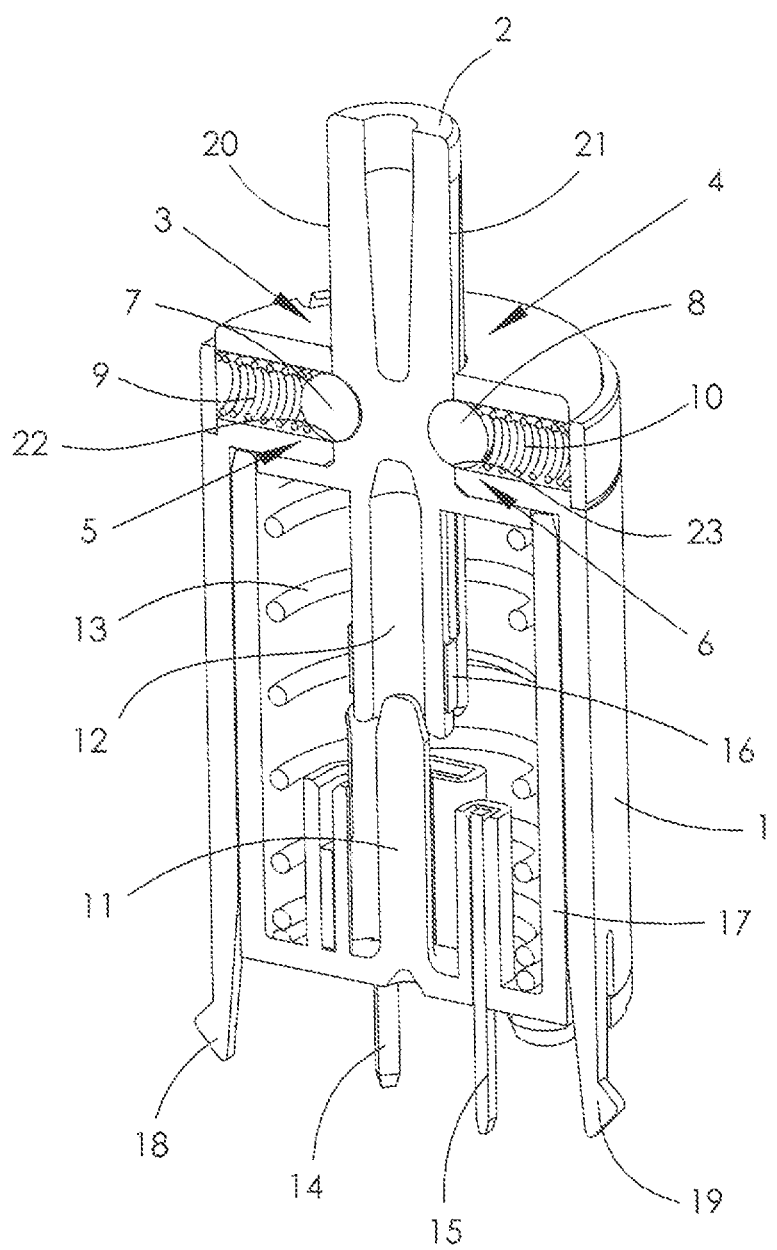
FIG. 1 is a sectioned perspective view of a device according to the preferred embodiment of the present invention with a non-actuated actuating element.

FIG. 1 shows a perspective sectional view of a device according to the invention for switching and controlling electrical apparatuses, with a guide bearing, which has a bearing part constructed as a switch housing 1 and a bearing part constructed as an actuating element 2. In the exemplary embodiment illustrated, the guide bearing has two control paths 3, 4 constructed on the actuating element 2 for forming haptics, and also two rolling-body mounts 5, 6 in each case assigned to one control path 3 or 4 and constructed on the switch housing 1. A spherical rolling body 7, 8 is held in the same in each case. To this end, the rolling-body mounts 5, 6 have a haptic spring 9, 10 pressing one of the rolling bodies 7, 8 thereof onto one of the control paths 3, 4 of the actuating element 2. To construct a linear bearing accommodating the actuating element 2 in the switch housing 1 in a forcibly movable manner, the switch housing 1 has a guide mandrel 11 and the actuating element 2 has a sliding bush 12 guided in a linearly movable manner on the guide mandrel 11. In addition, the guide bearing has a return spring 13 acting on the actuating element 2, which is enclosed together with the guide mandrel 11, the sliding bush 12 and also electrical switch contacts 14, 15, 16 in a spring cup 17 of the switch housing 1. Catches 18, 19 constructed on the switch housing 1 are used for fastening the device according to the invention in the carrier structure of an electrical apparatus. The control paths 3, 4 in each case have a track groove 20, 21 arranged in the course thereof and also a catch or latching recess 22, 23 delimiting the track groove at the end in each case. FIG. 1 shows the actuating element 2 in a non-actuated end position, in which the rolling bodies 7, 8 lie in the latching recesses 22, 23 of the control paths 3, 4.

Figure 2:
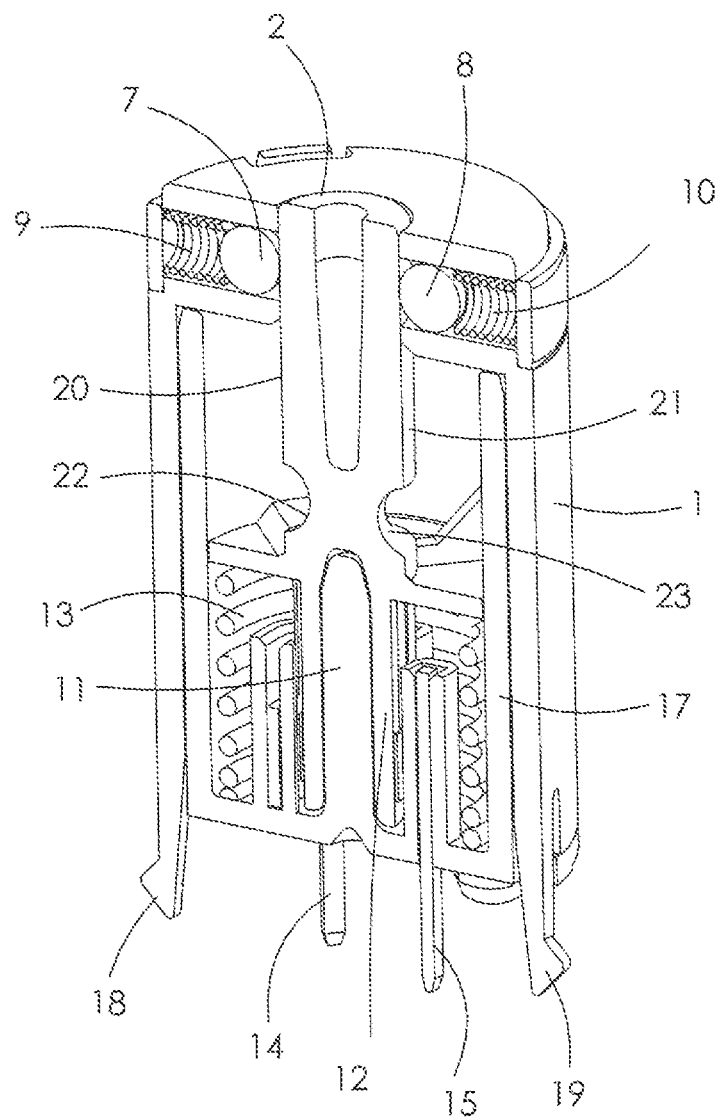
FIG. 2 is an enlarged sectional view of the device of FIG. 1, with the actuating element in an actuated state.

FIG. 2 shows a perspective sectional view of the device according to FIG. 1, but in an actuated end position, in which the spherical rolling bodies 7, 8 are held in the ends of the track grooves 20, 21 remote from the latching recesses 22, 23, counter to an acting reset force, caused by the return spring 13. The track grooves 20, 21 have a course deviating from the guide direction of the actuating element 2, so that the track grooves 20, 21 in each case have open track groove end running out of a cylindrical surface of the actuating element 2 in an elongated manner.

Figure 3:
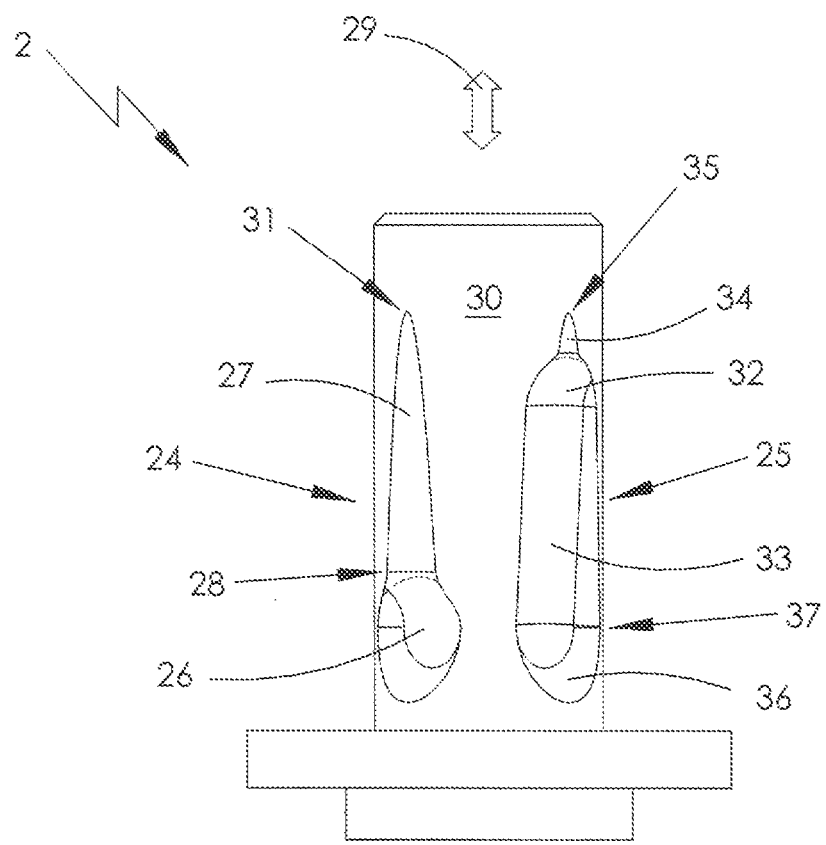
FIG. 3 is a partial view of the actuating element.

FIG. 3 shows a partial view of an actuating element 2 for a device according to another embodiment of the present invention. The illustrated actuating element 2 has a plurality of control paths 24, 25 with courses constructed differently from one another. The control path 24 has a latching recess 26 arranged in the course thereof and also a track groove 27 constructed in the course thereof, wherein the track groove 27 has a track groove end 28 delimited by the latching recess 26. The track groove 27 has a course deviating from the guide direction according to the double arrow 29 of the actuating element 2, so that it in each case constructs an open track groove end 31 running out of a cylindrical surface 30 of the actuating element 2 in an elongated manner. The control path 25 by contrast has a switching step 32 constructed in the course thereof and also two track grooves 33, 34 connected to one another by means of the switching step 32. Both track grooves 33, 34 have courses deviating in a straight line from the guide direction according to the double arrow 29, wherein only the track groove 34 has an open track groove end 35 running out of the cylindrical surface 30 of the actuating element 2 in an elongated manner. The track groove 33 by contrast has a track groove end 37 delimited by a shaped stop 36.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined by the appended claims.

The invention claimed is:

1. A device for switching and controlling electrical apparatuses, comprising:
   a guide bearing, including:
   a switch housing that has an opening on a first end of the switch housing and a guide mandrel that is formed on and inwardly protects from a second end of the switch housing that is opposite from the first end; and
   an actuating element that moves in a direction towards and away from the second end of the switch housing, the actuating element having an outside end that protects through the opening on the first end and outwardly from the first end of the switch housing, an inside end that is positioned inside the switch housing, and a slide bush formed on the inside end, through which the guide mandrel of the switching housing is inserted,
   wherein the actuating element has at least one control path formed on the outside end thereof, and
   the switch housing has at least one rolling-body mount that holds at least one rolling body and at least one haptic spring pressing the at least one rolling body onto the at least one control path of the actuating element, and
   the at least one control path with engagement of the at least one rolling-body guides the movement of the actuating element in the direction towards and away from the second end of the switching housing.

2. The device of claim 1, wherein the at least one rolling body is a ball.

3. The device of claim 1, wherein the guide bearing is constructed as a linear bearing.

4. The device of claim 1, wherein the at least one control path has at least one latching recess arranged in the course thereof.

5. The device of claim 1, wherein the at least one control path has at least one switching step arranged in the course thereof.

6. The device of claim 1, wherein the at least one control path has at least one track groove constructed in the course thereof.

7. The device of claim 6, wherein the at least one track groove has a course deviating from the guide direction of the actuating element.

8. The device of claim 6, wherein the at least one track groove has at least one track groove end delimited by the latching recess.

9. The device of claim 6, wherein the at least one track groove has at least one track groove end delimited by a shaped stop.

10. The device of claim 6, wherein the at least one track groove has at least one open track groove end running out of a surface of the actuating element in an elongated manner.

11. The device of claim 1, wherein the actuating element further includes at least one return spring acting on the actuating element.

12. The device of claim 1, wherein the actuating element has a plurality of control paths, and the switch housing has a plurality of rolling-body mounts holding a rolling body held bearing in a spring-loaded manner.

13. The device of claim 12, wherein the plurality of control paths have courses that are constructed differently from one another.

14. The device of claim 11, wherein the at least one return spring includes a non-moving end abutting the second end of the switch housing and a moving end that moves along the movement of the actuating element.

15. The device of claim 1, wherein the actuating element is one piece.

16. The device of claim 1, wherein
   the actuating element has a first electrical switch contact formed on an exterior surface of the inside end thereof,
   the switch housing has at least one second electrical switch contact projecting from the second end of the switch housing, and
   the first electrical switch contact slidingly contacts the at least one second electrical switch contact according to the movement of the actuating element.

* * * * *